United States Patent

Payne et al.

[11] Patent Number: 5,316,358
[45] Date of Patent: May 31, 1994

[54] INTEGRAL STORAGE CONTAINER FOR PICK-UP TRUCK

[75] Inventors: Phillip E. Payne, Northville; Clyde N. Ney, Waterford, both of Mich.

[73] Assignee: Chrysler Corporation, Highland Park, Mich.

[21] Appl. No.: 832,067

[22] Filed: Feb. 6, 1992

[51] Int. Cl.⁵ .............................................. B60R 9/00
[52] U.S. Cl. .................................... 296/37.6; 296/24.1
[58] Field of Search .................. 296/37.6, 37.1, 24.1; 224/42.42

[56] References Cited

U.S. PATENT DOCUMENTS

| | | | |
|---|---|---|---|
| 2,616,754 | 11/1952 | Stahl | 296/37.6 |
| 2,978,153 | 4/1961 | Brindle | 296/37.6 |
| 3,844,158 | 10/1974 | Mercer | 296/37.6 X |
| 3,940,009 | 2/1976 | Szeles | 296/37.6 X |
| 4,288,011 | 9/1981 | Grossman | 224/42.42 |
| 4,451,075 | 5/1984 | Canfield | 296/37.6 |
| 4,728,017 | 3/1988 | Mullican | 296/37.6 |
| 4,750,773 | 6/1988 | Chapline et al. | 296/37.6 |
| 4,844,305 | 7/1989 | McKneely | 224/42.42 |
| 4,892,345 | 1/1990 | Rachael, III | 296/24.1 |
| 4,892,346 | 1/1990 | Berlin | 296/37.6 |
| 4,917,430 | 4/1990 | Lawrence | 296/37.6 |
| 4,971,092 | 11/1990 | Parry et al. | 296/37.6 X |
| 5,072,852 | 12/1991 | Smith et al. | 220/532 |
| 5,088,636 | 2/1992 | Barojas | 296/37.6 |
| 5,188,414 | 2/1993 | Burnham et al. | 296/37.6 |

Primary Examiner—Robert R. Song
Attorney, Agent, or Firm—Mark P. Calcaterra

[57] ABSTRACT

A storage container primarily for use as a tool or utility box for pick-up trucks. The container is located in the space between the rear wall of the truck cab and the front wall of the truck bed. The container is generally box-shaped with a mechanism to enable access within the container and a mechanism to releasably lock the container. The container also has a hollow lower bin with a mechanism to enable access to the bin. The lower bin can be used to store tools, small objects or containers of liquid which have a tendency to spill.

6 Claims, 2 Drawing Sheets

INTEGRAL STORAGE CONTAINER FOR PICK-UP TRUCK

BACKGROUND AND SUMMARY OF THE INVENTION

The present invention relates to pick-up truck storage containers and, more particularly to storage containers permanently secured to a pick-up truck between the truck cab and the truck bed..

Truck storage containers are typically removably secured within the truck bed. Illustrative of such prior art are U.S. Pat. Nos. 4,750,773 and 4,288,011. Other containers are removable and secured to the rear end of the truck bed, as illustrated by U.S. Pat. No. 4,451,075. Finally, storage containers are also located between the passenger door of the truck cab and the rear wall of the cab as illustrated by U.S. Pat. No. 4,917,430.

The above identified containers have several disadvantages. One disadvantage of the containers is that the consumer must secure the container to the truck bed. Also, the storage containers occupy a portion of the truck bed, thereby decreasing the amount of storage space available in the truck bed. Finally, the containers do not provide for the insertion of dividers to separate the storage container into separate compartments.

It is desirable to have a storage container in a pick-up truck, since small articles, tools or containers placed directly in the truck bed will be subject to constant movement, unless stored in a separate container. It is also desirable to have a means of separating a storage container into even smaller compartments in order to decrease the movement of the objects. Finally, it is desirable to have a means for attaching a luggage rack to a truck storage container. In accordance with the teachings of the present invention there is provided a storage container permanently secured between a truck bed and a truck cab. The storage container includes separate lower storage bins and dividers to separate the container into separate compartments. The present invention provides a storage container with hollow lower bins to store tools, small objects and containers of liquid, which otherwise may easily spill or leak in the container. The invention also provides a storage container including means to attach a luggage rack to the storage container.

From the following detailed description taken in conjunction with the accompanying drawings and claims, other objects and advantages of the present invention will be apparent to those skilled in the art.

DETAILED DESCRIPTION OF THE PREFERRED EMBODIMENT

Figure 1:
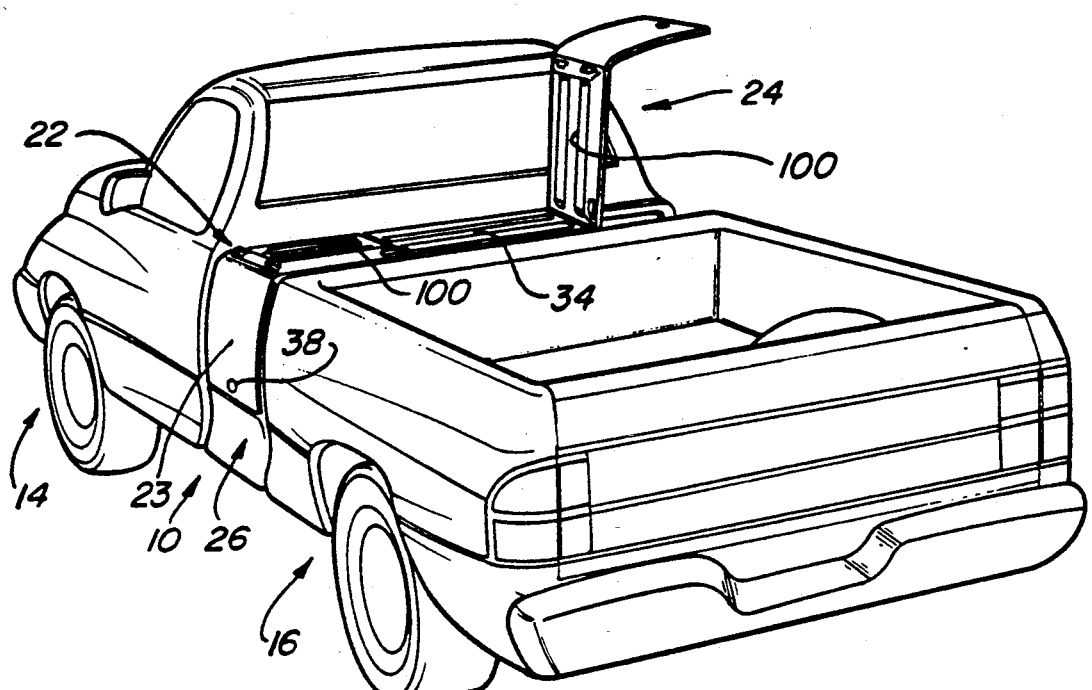
FIG. 1 is a perspective view of a pick-up truck with a storage container in accordance with the present invention.

Turning to the drawings, particularly FIG. 1, a pick-up truck is illustrated with a storage container 10. The pick-up truck includes a cab 14 and bed 16 both of which are secured to a frame 18. The storage container 10 is securely positioned between the cab 14 and bed 16.

Figure 2:
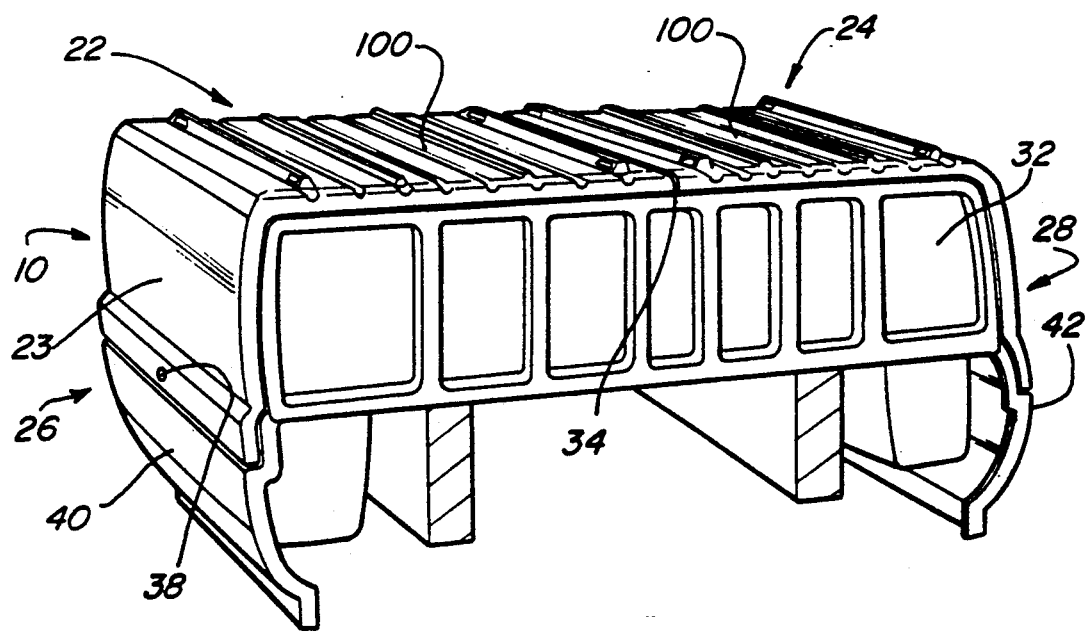
FIG. 2 is a perspective view of the exterior of a storage container.
Figure 3:
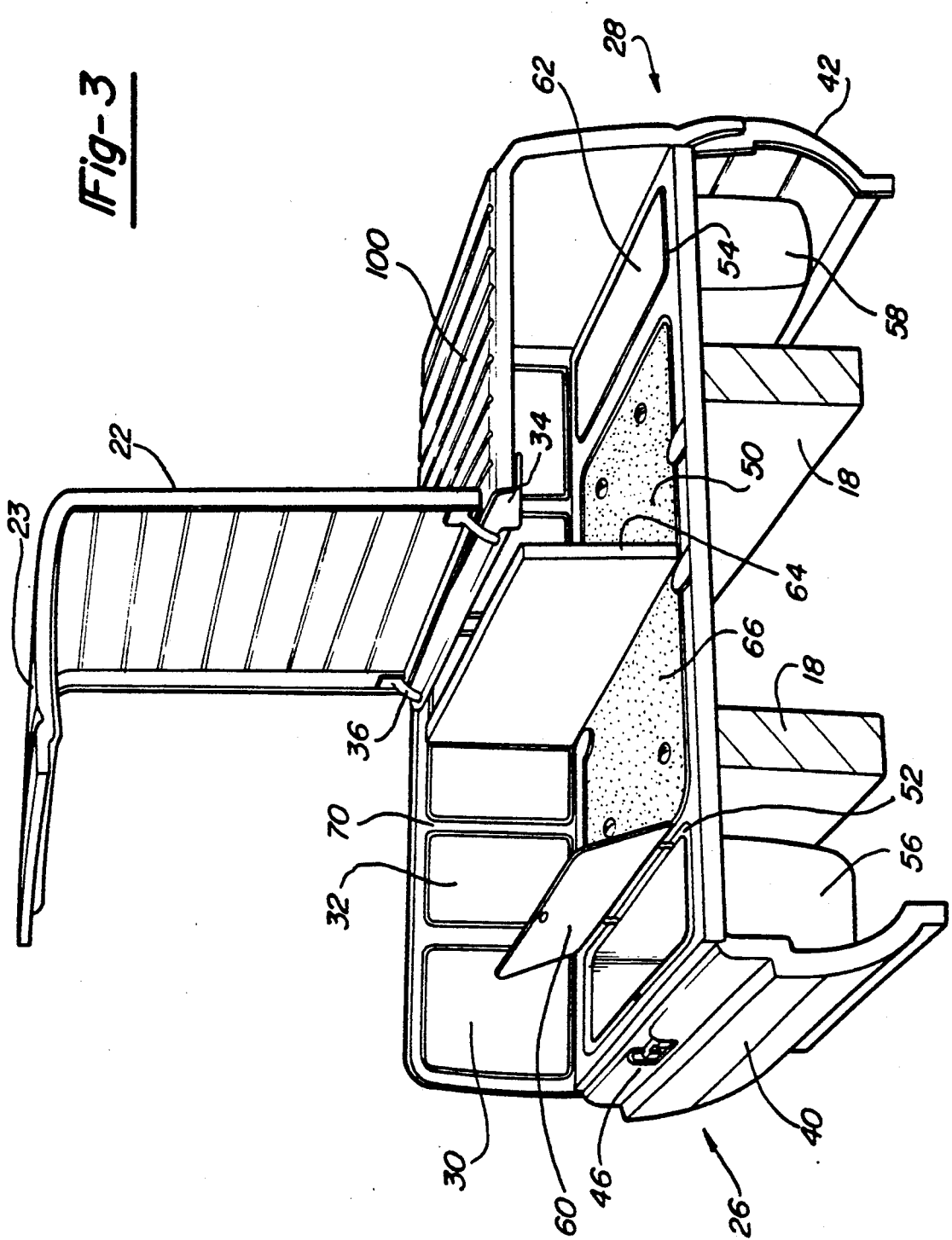
FIG. 3 is a perspective view partially in cross-section of the storage container of FIG. 2.

The container 10 is generally box-shaped and includes raisable top lids 22 and 24, side walls 26 and 28 and front and rear walls 30 and 32. The raisable top lids 22 and 24 have an overall L-shape, when viewed in side elevation. One portion 23 of L forms a portion of side walls 26 and 28 as seen in FIG. 2. A beam 34 spans between front and rear walls 30 and 32 to enable securement of the lids 22 and 24 to the beam 34 by a hinge mechanism 36, as seen in FIG. 3. The beam 34 could be an enlarged panel and the raisable lids would be shorter and secured to the panel, as seen in FIG. 1. The top lids 22 and 24 include an opening mechanism 38 in the portion 23 to enable the top lids 22 and 24 to be locked in a closed position with the side walls 26 and 28. The opening mechanism may be a push button, handle or the like with a corresponding structure on the side walls 26 and 28 to secure the top lids 22 and 24 in a lowered position. Likewise the hinge mechanism 36 may be spring loaded to raise the top lids 22 and 24 upon opening of the opening mechanism 38. The container top lids 22 and 24 have ribbing 100 on the exterior portion 102 of the top wall. The ribbing 100 enables a luggage rack (not shown) or the like to be easily secured to the container top lids 22 and 24. The ribbing 100 also allows for larger objects to be placed and secured on the container top lids 22 and 24, thereby creating a minimal amount of movement for the object. If the luggage rack is secured to a container top lids 22 and 24, there is no decrease in the amount of storage space available in the truck bed 16.

The side walls 26 and 28 include panels 40 and 42 which blend with the body panels of the cab and bed 14 and 16. The panels 40 and 42 include a locking mechanism 46 to secure the opening mechanism 38 with the side walls 26 and 28. The front and rear walls 30 and 32 abut the cab 14 and bed 16, respectively, once the container 10 is positioned onto the truck frame. The box is substantially water tight to prevent precipitation from entering inside the container. Likewise, seals may be positioned on the longitudinal and lateral edges of the front and rear walls 30 and 32 to further seal the raisable top lids 22 and 24 with the walls 30 and 32.

Upon opening of the container 10, the container includes a floor board 50. The floor board 50 includes openings at 52 and 54 at its lateral ends closest to the side walls 26 and 28. The openings 52 and 54 include bins 56 and 58 which are positioned and secured within the openings 52 and 54. Also, covers 60 and 62 cover the bins 56 and 58 to enable limited access within the bins 56 and 58. The bins 56 and 58 extend downward from the container floor 50 on each side of the frame 18 as seen in FIG. 3. The container floor 50 includes a roughed or non-skid surface 66 to enhance positioning of articles placed on the container floor 50. A divider 64 is positioned within the container 10 to divide the floor 50 and the container 10 into smaller areas. The divider 64 may be positionable within the container 10 along the floor 50. The interior of the container front wall 32 contains recesses 70 which allow for the insertion of dividers to separate the container. The container 10 is secured to the frame 20 by bolts or the like passing through the floor 50 of the container into the frame 18, as seen in FIG. 3. The bolts or the like secured the container 10 in position between the cab 14 and the bed 16. Thus, the container is intended to be permanently affixed between the cab 14 and the bed 16.

While the above detailed description describes the preferred embodiment of the present invention, it will be understood that the present invention is susceptible to modification, variation and alteration without deviating from the scope of the subjoined claims.

What is claimed is:

1. A storage container for a pick-up truck having a cab and a truck bed both secured to a frame, said storage container adapted to be secured between the cab and the truck bed comprising:
    an overall box shaped member having means for enabling access within said box shaped member, said box shaped member having a rear wall abutting a front wall of the truck bed; and
    means for securing said box shaped member to the frame between the cab and truck bed, wherein said box shaped member has a front wall abutting a rear wall of the cab.

2. The storage container according to claim 1 wherein said container includes at least one lower bin.

3. The storage container according to claim 2 wherein said lower bin is generally a box-shaped member having means for enabling access within said lower bin.

4. A storage container for a pick-up truck having a cab and a truck bed both secured to a frame, said storage container adapted to be secured between the cab and the truck bed comprising:
    an overall box shaped member having means for enabling access within said box shaped member;
    means for securing said box shaped member to the frame between the cab and truck bed, wherein said box shaped member has a front wall abutting a rear wall of the cab; and
    means for attaching a luggage rack to said container.

5. The container according to claim 4 wherein said box shaped member includes a top lid, and further wherein said means for attaching said luggage rack to said container comprises a ribbing on said top lid.

6. A storage container adapted to be secured between a pick-up truck cab and a pick-up truck bed, said container comprising:
    a front wall, a rear wall, a floor, a top lid, a pair of opposing vertical side panels;
    a lower storage bin having means for enabling access to said bin associated with said floor;
    means for locking said container top lid with said side panels; and
    means for dividing said container into separate compartments.

* * * * *